The United States Patent

McCullen et al.

[11] Patent Number: 4,849,568
[45] Date of Patent: Jul. 18, 1989

[54] STABILIZATION OF ZINC ON CATALYSTS

[75] Inventors: Sharon B. McCullen, Newtown, Pa.; Paul G. Rodewald, Rocky Hill, N.J.

[73] Assignee: Mobil Oil Corporation, New York, N.Y.

[21] Appl. No.: 140,275

[22] Filed: Dec. 31, 1987

[51] Int. Cl.$^4$ ............................................. C07C 15/393
[52] U.S. Cl. .................................... 585/407; 585/415; 585/417; 585/418; 585/419
[58] Field of Search ............... 585/415, 417, 418, 419, 585/407

[56] References Cited

U.S. PATENT DOCUMENTS

| | | | |
|---|---|---|---|
| 3,760,024 | 9/1973 | Cattanach | 585/414 |
| 3,845,150 | 10/1974 | Yan et al. | 208/135 |
| 3,931,349 | 1/1976 | Kuo | 585/310 |
| 3,998,899 | 12/1976 | Daviduk et al. | 585/314 |
| 4,044,061 | 8/1977 | Chang et al. | 585/402 |
| 4,097,367 | 6/1978 | Haag et al. | 208/135 |
| 4,120,910 | 10/1978 | Chu | 585/417 |
| 4,128,504 | 12/1978 | Plank et al. | 502/60 |
| 4,304,657 | 12/1981 | Miller | 585/418 |
| 4,350,835 | 9/1982 | Chester et al. | 585/415 |
| 4,590,322 | 5/1986 | Chu | 585/417 |
| 4,670,614 | 6/1987 | Ushio et al. | 585/418 |

OTHER PUBLICATIONS

Chen et al., "M2-Forming-a Process for Aromatization of Light Hydrocarbons" *Ind. Eng. Chem. Process Des. Dev.*, 25, 151–155 (1986).

*Primary Examiner*—Curtis R. Davis
*Attorney, Agent, or Firm*—Alexander J. McKillop; Charles J. Speciale; Robert B. Furr, Jr.

[57] ABSTRACT

A process for converting a $C_1$–$C_{12}$ non-aromatic hydrocarbon feed to aromatics by contacting the feed with a zinc-containing medium pore size zeolite catalyst in a conversion zone, comprising adding at least one non-metal oxide or sulfide to the feed in an amount effective to prevent elution of zinc from the zinc-containing zeolite catalyst.

16 Claims, 1 Drawing Sheet

STABILIZATION OF ZINC ON CATALYSTS

FIELD OF THE INVENTION

The present invention relates to the conversion of hydrocarbons to aromatics using a zeolite catalyst containing zinc. More particularly, the present invention relates to a method for stabilizing such zinc catalysts in reducing atmosphere at high temperatures.

BACKGROUND OF THE INVENTION

Various methods for upgrading hydrocarbons to aromatics with crystalline aluminosilicate zeolite catalysts are generally known. For example, methods for producing gasoline boiling range hydrocarbons from methanol or other lower aliphatic oxygenates (an "MTG" process) are exemplified in U.S. Pat. Nos. 3,998,899, 3,931,349 and 4,044,061. Also, methods for producing gasoline boiling range hydrocarbons from light hydrocarbon feeds containing, e.g., paraffins, olefins and naphthenes have also been developed. Such processes have been labeled as "M2-forming." See, e.g., Chen, et al, "M2-forming—A Process for Aromatization of Light Hydrocarbons", *Ind. Eng. Chem. Process Des. Dev.*, 25, 151–155 (1986). U.S. Pat. Nos. 3,760,024, 4,120,910, 3,845,150 and 4,350,835 are generally illustrative of this type of aromatization process.

The M2-forming aromatization process uses a medium pore zeolite catalyst to upgrade the paraffinic, olefinic, naphthenic or lower aliphatic oxygenate feed to gasoline boiling range hydrocarbons. These types of medium pore size zeolite catalysts will be described in greater detail hereinafter. Further, suitable aluminosilicate medium pore size zeolite catalysts for use in an M2-forming process often have zinc (a dehydrogenation metal) incorporated therein/thereon by means of ion exchange or impregnation techniques.

In an M2-forming process, zinc-impregnated aluminosilicate zeolite catalysts, such as Zn/ZSM-5, are known to be active as well as selective for the M2-forming aromatization reactions. Light hydrocarbons, such as paraffins, olefins and naphthenes are converted to aromatics via complex, consecutive, acid-catalyzed reactions, including (1) conversion of olefinic and paraffinic molecules to small olefins via acidic cracking and hydrogen-transfer reactions, (2) formation of $C_2$–$C_{10}$ olefins via transmutation, oligomerization, cracking and isomerization reactions, and (3) aromatic formation via cyclization and hydrogen transfer, as explained by Chen et al in the above-noted article on M2forming.

In any event, the desired result of this type of process is the production of gasoline boiling range materials. Gasoline, as such term is used in the instant specification, and as such ter is commonly used in the petroleum industry, is useful as a motor fuel for internal combustion engines. More specifically, gasoline is hydrocarbon in nature, and contains various aliphatic and aromatic hydrocarbons having a full boiling range of about 280° to 430° F., depending upon the exact blend used, and the time of year. Although gasoline is predominantly hydrocarbon in nature, various additives which are not necessarily exclusively hydrocarbon are often included. Additives of this type are usually present in very small proportions, e.g., less than 1% by volume of the total gasoline. It is also not uncommon for various gasolines to be formulated with non-hydrocarbon components, particularly alcohols and/or ethers as significant, although not major, constituents thereof. Such alcohols, ethers and the like have burning qualities in internal combustion engines which are similar to those of hydrocarbons in the gasoline boiling range. For purposes of this specification, the term "gasoline" is used to mean a mixture of hydrocarbons boiling in the aforementioned gasoline boiling range and is not intended to mean the above-referred to additives and/or non-hydrocarbon constituents.

In an M2-forming process, zinc-impregnated aluminosilicate intermediate pore size zeolite catalysts, such as Zn/HZSM-5, are known to be quite effective in attaining high aromatic yields. However, this type of zinc catalyst suffers irreversible loss of activity and selectivity due to zinc volatilization at the high temperatures encountered during conversion. It is known that zinc metal has a high vapor pressure at elevated temperatures. Consequently, zinc catalysts operating in reducing atmospheres at temperatures greater than about 300° C. will lose zinc by volatilization.

Several attempts have been made to prevent zinc elution from such catalysts. For example, U.S. Pat. No. 4,097,367 teaches that adding a second metal (in addition to zinc) selected from Group IB or VIII, such as palladium, to medium pore size zeolite catalysts will inhibit zinc elution from the catalyst in a reducing atmosphere under conversion conditions of temperatures in the range of about 900° to about 1200° F. However, the powerful catalytic metal palladium does not enhance activity of the catalyst in the sense of achieving increased conversion. Similarly. U.S. Pat. No. 4,490,569 teaches that elution of zinc from zinc-impregnated zeolite catalysts can be minimized by incorporating gallium into the catalyst composition, where palladium is optionally also included in the catalyst composition. U.S. Pat. No. 4,128,504 also is directed to a method of preventing the elution of zinc from a zinc-containing zeolite by incorporating therein another metal selected from the group consisting of metals of Group IB and VIII of the periodic table, germanium, rhenium, and the rare earths, e.g., cerium. Examples of such metals from Groups IB and VIII include copper, gold, silver, platinum and nickel. These prior attempts to stabilize zinc involved the formation of an alloy comprising zinc and a second metal, such as Pd or Ga to reduce the zinc vapor pressure.

However, none of these prior attempts have proven completely successful at preventing zinc elution from zinc-impregnated zeolite catalysts. Moreover, the noble metals, etc., employed as elution preventing metals on the catalyst in these above-described methods are expensive, thus making their use less desirable from an economic perspective.

Thus, an effective and relatively inexpensive method of stabilizing the zinc metal on zeolite catalysts so as to result in economically desirable longer catalytic life is still desired.

SUMMARY OF THE INVENTION

Accordingly, one object of the present invention is to provide a process for upgrading $C_2$–$C_{12}$ non-aromatic hydrocarbons to aromatics with a zinc-containing zeolite catalyst by effectively stabilizing zinc on the catalyst.

Another object of the present invention is to decrease the rate of zinc elution from zinc-impregnated zeolite catalysts, thus resulting in a longer catalytic life.

Still another object of the present invention is to provide an improved process for upgrading $C_2$–$C_{12}$ non-aromatic hydrocarbons to aromatics with a zinc-containing zeolite catalyst from an economic standpoint, by providing a longer catalytic life in a relatively inexpensive manner.

To achieve the foregoing objects and in accordance with its purpose, the present invention provides a process for converting a $C_2$–$C_{12}$ non-aromatic hydrocarbon feed to aromatics by contacting the feed with a zinc-containing medium pore size zeolite catalyst in a conversion zone, comprising adding at least one non-metal oxide or sulfide to the feed in an amount effective to prevent elution of zinc from the zinc-containing zeolite catalyst.

Preferably, the non-metal oxide or sulfide is present in the feed in an amount of from about 0.02 wt. % to about 50 wt. %, more preferably from 0.05 wt. % to 20 wt. %, based on the total weight of the feed after addition of the non-metal oxide and/or sulfide.

The non-metal oxide preferably is selected from the group consisting of carbon dioxide, water vapor, nitrogen oxide, nitrogen dioxide and dinitrogen oxide, and the sulfide preferably is selected from the group consisting of $H_2S$, thiophene, sulfur dioxide, carbon disulfide, dimethylsulfide and dimethyldisulfide.

The $C_2$–$C_{12}$ hydrocarbon feed preferably comprises non-aromatic hydrocarbons, including paraffins and naphthenes, and may contain olefins.

It is also preferred that the zeolite catalyst has a Constraint Index of from 1 to 12, a silica to alumina ratio of at least about 12, and a crystal framework density of not substantially less than about 1.6 g/cc. A matrix binder preferably is employed with the zeolite catalyst to form a catalyst composite, the composite containing the zeolite in a proportion of from 1 to 95% by weight.

Preferably, zinc is incorporated in the zeolite catalyst in an amount from about 0.01 to about 20 wt. % based on the total weight of the zeolite and zinc.

The conversion of the feed to aromatics in the conversion zone preferably occurs at a temperature of from about 650° to about 1300° F., at a pressure below about 400 psig, and the WHSV of the feed is within the range of about 0.1 to about 1000.

DETAILED DESCRIPTION OF THE INVENTION

The hydrocarbon feed suitable for use in the process of the present invention generally comprises $C_2$–$C_{12}$ non-aromatic hydrocarbons. More particularly, the feed can contain paraffins, olefins and naphthenes. Of course, the feed composition will vary to some extent in practice. For example, the process of the present invention is also applicable to aromatization processes employing simply a paraffinic feed over zinc-impregnated medium pore size zeolite catalysts. It will be understood, however, that a wide range of hydrocarbon materials may be employed as the feed, as long as they are capable of being converted into the desired aromatics with the zinc catalyst of the present invention, described in detail below.

The zinc-impregnated zeolite catalysts suitable for use in the present invention will be described in detail hereinafter. These zeolites are members of a particular class of zeolites exhibiting some unusual properties, capable of inducing profound transformations of aliphatic hydrocarbons to aromatic hydrocarbons in commercially desirable yields and are generally highly effective in alkylation, isomerization, disproportionation and other reactions involving aromatic hydrocarbons. These zeolite catalysts are commonly employed in the above-discussed M2-forming and other aromatization processes. Although they have unusually low alumina contents, i.e., high silica to alumina ratios exceeding 30. This activity is surprising since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g., of the X and A type. Furthermore, carbonaceous deposits, when formed on the zeolite, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides a selective constrained access to, and egress from, the intra-crystalline free space by virtue of having an effective pore size between the small pore Linde A and the large pore Linde X, i.e., the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline aluminosilicate, the oxygen atoms themselves being bonded to the silicon (or aluminum, etc.) atoms at the centers of the tetrahedra. Briefly, the preferred zeolites useful as catalysts in this invention possess, in combination: a "Constraint Index" (defined hereinafter) of from 1 to 12; a silica to alumina ratio of at least about 12; and a structure providing a selective constrained access to the crystalline free space.

The silica to alumina mole ratio referred to may be determined by conventional analysis. This ratio is meant to represent, as closely as possible, the silica to alumina ratio in the rigid anionic framework of the zeolite crystal and to exclude the aluminum in the binder or which is in a cationic or other form within the channels. Although zeolites with silica to alumina mole ratios of at least 12 are useful, it is preferred to use zeolites having higher ratios of at least about 30. In some instances, zeolites having substantially higher silica/alumina ratios, e.g., 1600 and above, may be used.

Such zeolites, after activation, acquire an intracrystalline sorption capacity for normal hexane which is greater than that for water, i.e., they exhibit "hydrophobic" properties. It is believed that this hydrophobic character is advantageous in the present invention.

The members of the class of zeolites useful in the present invention have an effective pore size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA (tetramethyl ammonium) offretite does show some constrained access. Other 12-ring structures may exist which may be operative for other reasons, and therefore, it is not the intention of the present invention to entirely judge the usefulness of the particular zeolite solely from theoretical structure considerations.

A convenient measure of the extent to which a zeolite provides controlled access to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g. less than 5 Angstroms. On the other hand, zeolites which provide relatively free access to the internal zeolite structure have a low value for the Constraint Index, and usually pores of large size, e.g. greater than 8 Angstroms. The method by which Constraint Index is determined is described fully in U.S. Pat. No. 4,016,218, incorporated herein by reference for details of the method.

Constraint Index (CI) values for some typical materials, including some that are not within the purview of the present invention, are:

|  | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. The Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the zeolites described in the above table, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those of ordinary skill in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest for use in the present invention within the approximate range of 1 to 12.

The class of zeolites which is useful in the practice of the present invention is exemplified by ZSM-5, ZSM-11, ZSM-12, ZSM-22, ZSM-23, ZSM-35, ZSM-38, ZSM-48, Zeolite Beta and other similar materials.

ZSM-5 is more particularly described in U.S. Pat. No. 3,702,886 and U.S. Pat. Re. 29,948, the entire contents of which are incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-22 is more particularly described in U.S. Pat. Nos. 4,481,177, 4,556,477 and European Pat. No. 102,716, the entire contents of each being expressly incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

Zeolite Beta is taught in U.S. Pat. No. 3,308,069 and is taught as a catalyst component for isomerization dewaxing in U.S. Pat. Nos. 4,419,220 and 4,501,926. These disclosures are also incorporated herein by reference.

ZSM-48 is more particularly described in U.S. Pat. No. 4,397,827 the entire contents of which are incorporated herein by reference. The following description illustrates characteristics of zeolites useful in the present invention, using ZSM-48 as an example. This zeolite can be identified, in terms of moles of anhydrous oxides per 100 moles of silica, as follows:

(0–15)RN:(0–1.5)$M_{2/n}$O:(0.2)$Al_2O_3$:(100)$SiO_2$ wherein:

M is at least one cation having a valance n; and
RN is a $C_1$–$C_{20}$ organic compound having at least one amine > functional group of $pK_a \not< 7$.

It is recognized that, particularly when the zeolite ZSM-48 composition contains tetrahedral framework aluminum, a fraction of the amine functional groups may be protonated. The doubly protonated form, in conventional notation, would be $(RNH)_2O$ and is equivalent to stoichiometry to $2\ RN + H_2O$.

The characteristic X-ray diffraction pattern of the synthetic zeolite ZSM-48 has the following significant lines:

| Characteristic Lines of ZSM-48 | |
|---|---|
| d (Angstroms) | Relative Intensity |
| 11.9 | W–S |
| 10.2 | W |
| 7.2 | W |
| 5.9 | W |
| 4.2 | VS |
| 3.9 | VS |
| 3.6 | W |
| 2.85 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100\ I/I_o$, where $I_o$ is the intensity of the strongest line or peak, and d (obs.), the interplanar spacing in angstroms, corresponding to the recorded lines, were calculated. In the foregoing table the relative intensities are given in terms of the symbols W=weak, VS=very strong and W-S=weak-to-strong. Ion exchange of the sodium ion with cations reveals substantially the same pattern with some minor shifts in interplanar spacing and variations in relative intensity. Other minor variations can occur depending on the silicon to aluminum ratio of the particular sample, as well as whether it has been subjected to thermal treatment. The ZSM-48 can be prepared from a reaction mixture containing a source of silica, water, RN, an alkali metal oxide (e.g. sodium) and optionally alumina. The reaction mixture should have a composition, in terms of mole ratios of oxides, falling within the following ranges:

| REACTANTS | | BROAD | PREFERRED |
|---|---|---|---|
| $Al_2O_3/SiO_2$ | = | 0 to 0.02 | 0 to 0.01 |
| $Na/SiO_2$ | = | 0 to 2 | 0.1 to 1.0 |
| $RN/SiO_2$ | = | 0.01 to 2.0 | 0.05 to 1.0 |
| $OH-/SiO_2$ | = | 0 to 0.25 | 0 to 0.1 |
| $H_2O/SiO_2$ | = | 10 to 100 | 20 to 70 |
| H+ (added) $SiO_2$ | = | 0 to 0.2 | 0 to 0.05 | wherein RN is a $C_1$–$C_{20}$ organic compound having at least one amine functional group of $pK_a$ 24 7. The mixture is maintained at 80°–250° C. until crystals of the material are formed. H+ (added) is moles acid added in excess of the moles of hydroxide added. In calculating H+ (added) and OH values, the term acid (H+) includes both hydronium ion, whether free or coordinated, and aluminum. Thus aluminum sulfate, for example, would be considered a mixture of aluminum oxide, sulfuric acid, and water. An amine hydrochloride would be a mixture of amine and HCl. In preparing the highly siliceous form of ZSM-48 no alumina is added. Thus, the only aluminum present occurs as an impurity in the reactants.

Preferably, crystallization is carried out under pressure in an autoclave or static bomb reactor, at 80° C. to 250° C. Thereafter, the crystals are separated from the liquid and recovered. The zeolite forming composition can be prepared utilizing materials which supply the appropriate oxide. Such materials include sodium silicate, silica hydrosol, silica gel, silicic acid, RN, sodium hydroxide, sodium chloride, aluminum sulfate, sodium aluminate, aluminum oxide, or aluminum itself. RN is a $C_1$–$C_{20}$ organic compound containing at least one amine functional group of $pk_a \geq 7$, and includes such compounds as $C_3$–$C_{18}$ primary, secondary, and tertiary amines, cyclic amines (such as piperidine, pyrrolidine and piperazine), and polyamines such as $NH_2$–$C_nH_{2n}$–$NH_2$ wherein n is 4–12.

Turning now from the specific description of zeolite ZMS-48 to the general class or zeolites to be used in the process of the present invention, the original cations in the zeolite can be subsequently replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated to exchange the original cations with ammonium ions or with hydronium ions. Catalytically active forms of these would include, in particular, hydrogen, rare earth metals, aluminum, manganese and other metal of Groups II and VIII of the Periodic Table.

It is understood that by incorporating by reference the foregoing patents to describe with greater particularity examples of specific members of the class of zeolites which can be used in the present invention, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation by reference of the above-identified patents should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described for use in the present invention, when prepared in the presence of organic cations, are substantially catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this special type of zeolite. However, the presence of these cations does appear to favor the formation of this special type of zeolite. More generally, it is desirable to activate this type of zeolite by base exchange with ammonium salts followed by calcination in air at about 1000° F. for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-22, ZSM-23, ZSM-35 and ZSM-48, with ZSM-5 particularly preferred.

The zeolites used as catalysts in this invention may be in the hydrogen form or they may be base exchanged or impregnated to contain ammonium or a metal cation complement in addition to zinc, if desired. It is desirable to calcine the zeolite after base exchange. The metal cations that may be present include any of the cations of the metals of Group I through VIII of the periodic table. However, in the case of Group IA metals, the cation content should in no case be so large as to substantially eliminate the activity of the zeolite for the catalysts being employed in the instant invention. For example, a completely sodium exchanged H-ZSM-5 appears to be largely inactive for shape selective conversions required in the present invention.

In a preferred aspect of this invention, the zeolites useful as catalysts herein are selected from those having a crystal framework density, in the dry hydrogen form, of not substantially below about 1.6 grams per cubic centimeter. It has been found that zeolites which satisfy all three of the discussed criteria (i.e., a Constraint Index of 1 to 12, a silica to alumina ratio of at least about 12, and a crystal framework density of not substantially below about 1.6 g/cc) are most desired for use in the present invention. When hydrocarbon products or by-products are catalytically formed, for example, such zeolites tend to maximize the production of gasoline boiling range hydrocarbon products. Therefore, the preferred catalysts of this invention are those comprising zeolites having a Constraint Index as defined above of about 1 to 12, a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article "Zeolite Structure" by W. M. Meier. This paper, the entire contents of which are incorporated herein by reference, is included in "Proceedings of the Conference on Molecular Sieves," (London, April, 1967) published by the Society of Chemical Industry, London, 1968.

When the crystal structure is unknown, the crystal framework density may be determined by classical pyknometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

It is to be understood that the practice of the present invention is also applicable to isomorphs of the above-described crystalline aluminosilicate catalysts. For example, the aluminum may be replaced by elements such as gallium, and silicon by elements such as germanium.

A matrix binder can be employed with the zeolite conversion catalyst. The matrix material should be resistant to the temperature and other conditions employed in the process of the present invention. The matrix binder imparts greater resistance to the catalyst for the severe temperature, pressure and reactant feed stream velocity conditions encountered in the process of the present invention. The catalyst can be incorporated, combined, dispersed, or otherwise intimately admixed with the matrix binder in such proportions that the resulting composite will contain from 1% to 95% by weight, and preferably from 10% to 70% by weight, of the zeolite in the final catalyst composite. A most preferred ratio is 65% by weight catalyst to 35% by weight matrix binder.

The term "matrix" includes inorganic compositions with which the zeolites can be incorporated, combined, dispersed, or otherwise intimately admixed with the catalyst wherein the matrix itself may be catalytically active or inactive, porous or non-porous. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide, aggregates, pumice, firebrick, diatomaceous earths, alumina and inorganic oxides. Inorganic compositions, especially those comprising alumina and those of a siliceous nature, are preferred. Of these matrices, inorganic oxides such as clay, chemically-treated clays, silica, silica alumina, etc., as well as alumina, are particularly preferred because of their superior porosity, attrition resistance and stability. Techniques for incorporating a zeolite catalyst into a matrix are known in the art and set forth in U.S. Pat. No. 3,140,253.

The zinc metal can be incorporated in the above-described zeolites by the well-known techniques of ion exchange or impregnation so as to comprise from about 0.01 to about 20 wt. %, preferably 0.1 to 10 wt. %, of the total weight of the zinc and zeolite catalyst.

The conversion zone utilized in the process of the present invention may be a fixed, fluidized or fluid transport type or moving catalyst bed arrangement, which are generally known in the art. A heat exchange type tubular reactor configuration may also be employed, if desired. Appropriate heat exchange apparatus may be provided both within and outside the catalyst bed, as desired or required by the particular conversion reactor design.

With respect to the conduct of the desired conversion reaction, the process conditions will vary depending on the particular type of process being employed. In processes for converting paraffins, olefins and/or naphthenes to aromatics, the reaction temperatures may range from about 650° to about 1300° F. The pressure may be from about atmospheric up to several hundred pounds pressure, but is below about 400 psig. The weight per hourly space velocity (WHSV) of the feed is usually within the range of about 0.1 to about 1000 WHSV, preferably 1 to 100. It will be readily understood by one of ordinary skill in the art, however, that the reaction conditions can be suitably selected depending upon the feed composition, the type of conversion reactor employed, the desired end-products, etc.

The reaction mixture recovered from the catalyst system will contain both aliphatic and aromatic boiling range hydrocarbons, lighter aliphatic hydrocarbons and water. Product recovery may be by a series of unit operations with a relatively simple condensation and decantation to separate a gaseous phase, a liquid hydrocarbon phase and an aqueous phase from each other. This condensation arrangement may be accomplished in heat exchange relation with cold feed in order to heat the cold feed to a predetermined and desired elevated temperature prior to entry into the conversion zone, if necessary. More specifically, the gaseous, liquid hydrocarbon and water phases may be separated by a conventional product separator, and the resulting gaseous and liquid hydrocarbon streams are sent to a conventional petroleum fractionator for separation and stabilization, and a waste water phase is usually sent to a waste water treatment plant.

To obtain the desired stabilization effects in accordance with the present invention, non-metal oxides or sulfides are added to the hydrocarbon feed. Suitable non-metal oxides include carbon dioxide, water vapor, nitrogen oxide (NO), nitrogen dioxide ($NO_2$), dinitrogen oxide ($N_2O$), etc. Suitable sulfides include $H_2S$, thiophene, sulfur dioxide ($SO_2$), carbon disulfide ($CS_2$), dimethylsulfide, dimethyldisulfide, other organic sulfur compounds, etc. Such non-metal oxides and sulfides may be present in the hydrocarbon feed in amounts ranging from about 0.02 wt. % to about 50 wt. %, preferably 0.05 wt % to 20 wt %, based on the total weight of the feed after the addition of the non-metal oxide and/or sulfide. However, a certain minimum amount of the oxide or sulfide must be added continuously to the feed or the Zn will elute from the zeolite. For example, as shown in the following table, at $H_2S$ levels as low as 760 ppm (parts per million, by wt), over 40 wt. % of the Zn has eluted after seven days on stream (DOS).

| Zinc and Sulfur Analysis After 7 DOS With a $C_6/C_7$ Naphtha at 538° C. and Added Thiophene | | | | |
|---|---|---|---|---|
| ppm S in Feed | Wt. % Zn Initial | Wt. % Zn Final | Wt. % S | S/Zn Atomic |
| 0 | 1.10 | 0.049 | 0 | |
| 760 | 0.90 | 0.51 | 0.25 | 1.00 |
| 1651 | 0.90 | 0.72 | 0.37 | 1.05 |
| 2730 | 0.90 | 0.66 | 0.30 | 0.93 |

In the above table, the three runs in which thiophene was added to the feed in amounts of 760, 1651 and 2730 ppm S, respectively, are within the scope of the present invention.

The unexpectedly superior effects of the present invention are demonstrated below with reference to the following Examples, which, however, are not to be construed as limiting the scope of the present invention in any manner whatsoever.

EXAMPLE 1

A Zn/HZSM-5 catalyst was prepared by adding 85.00 g HZSM-5 to 20.82 g zinc acetate dihydrate dissolved in 125 cc water and evaporating to dryness using a rotary evaporator. The residue was program calcined at 2° C./min to 538° C. and held at 538° C. for two hours. The final catalyst analyzed for 6.8% zinc.

EXAMPLE 2

Thermogravimetric analysis (TGA) was used to measure the rate of zinc elution from the catalyst of Example 1. Various mixtures of carbon dioxide and hydrogen were passed over the catalyst maintained at 550° C. Table 1 below summarizes the results and shows clearly that carbon dioxide inhibits zinc elution from the catalyst. At 75% $CO_2$/25% $H_2$, zinc elution is inhibited by a factor of 18.

TABLE 1

| Mole % | | % Zinc Eluted per day | Rate ($H_2$) Rate ($H_2$ + $CO_2$) |
|---|---|---|---|
| $H_2$ | $CO_2$ | | |
| 100 | 0 | 14.4 | 1.0 |
| 75 | 25 | 4.6 | 3.1 |
| 50 | 50 | 2.2 | 6.5 |
| 25 | 75 | 0.8 | 18 |
| 0 | 100 | 0.0 | ∞ |

EXAMPLE 3

Hydrogen gas containing 10 mole % water vapor was passed over the catalyst of Example 1. The temperature was 550° C. Zinc was eluted from the catalyst at a rate of 2.1% per day. When compared to anhydrous hydrogen, 10% water vapor in hydrogen inhibits zinc elution by a factor of 6.9 as indicated in Table 2 below.

TABLE 2

| Mole % | | % Zinc Eluted per day | Rate ($H_2$) Rate ($H_2$ + $CO_2$) |
|---|---|---|---|
| $H_2$ | $CO_2$ | | |
| 100 | 0 | 14.4 | 1.0 |
| 90 | 10 | 2.1 | 6.9 |

EXAMPLE 4

A sample of 1% Zn/HZSM-5 with a silica-alumina ratio of 1600/1 was prepared analogous to the procedure of Example 1. A 1.00 g sample of this catalyst was placed in a fixed bed flow reactor maintained at 550° C. and atmospheric pressure. Propane containing 10 mole % water was passed through the catalyst bed at 1.0 weight hourly space velocity. Propane conversion at 4.5 hours time on stream was 23%. Product selectivity is shown in Table 3.

TABLE 3

| Component | Wt. % | Component | Wt. % |
|---|---|---|---|
| Hydrogen | 5.19 | Butenes | 3.62 |
| Methane | 9.93 | $C_5 + C_6$ | 3.41 |
| Ethane | 4.85 | Benzene | 10.91 |
| Ethylene | 10.51 | Toluene | 12.06 |
| Propane | — | Ethylbenzene | 0.83 |
| Propylene | 31.55 | Xylenes | 4.59 |
| i-Butane | 0.73 | $C_9 +$ Aromatics | 1.37 |
| n-Butane | 0.45 | | |

After 35 hours on stream, the catalyst was removed from the reactor and air calcined at 538° C. overnight. Elemental analysis showed 1.03% zinc compared to 1.00% zinc for the fresh catalyst. Thus, 10 mol % water effectively stopped zinc elution from the catalyst.

By comparison, propane conversion under the above conditions, but in the absence of water, leads to a loss of 32% of the zinc from the catalyst after 20 hours on stream.

EXAMPLE 5

A 4.00 g sample of the Zn/HZSM-5 catalyst of Example 1 was placed in a fixed bed flow reactor maintained at 550° C. and atmospheric pressure. Propane containing 25 mole % carbon dioxide was passed through the catalyst bed at 0.2 total weight hourly space velocity. Propane conversion at 3 hours time on stream was 46%. Product selectivity is shown in Table 4.

TABLE 4

| Component | Wt. % | Component | Wt. % |
|---|---|---|---|
| Hydrogen | 4.39 | Butenes | 1.01 |
| Methane | 15.12 | $C_5 + C_6$ | 0.39 |
| Ethane | 10.56 | Benzene | 23.47 |
| Ethylene | 5.67 | Toluene | 20.41 |
| Propane | — | Ethylbenzene | 0.50 |
| Propylene | 10.30 | Xylenes | 6.43 |
| i-Butane | 0.25 | $C_9 +$ Aromatics | 1.13 |
| n-Butane | 0.39 | | |

After 14 days on stream, the catalyst was removed from the reactor and air calcined at 538° C. overnight. Elemental analysis showed 6.41% zinc compared to 6.80% zinc for the fresh catalyst. This corresponds to a 5.74% loss of zinc from the catalyst.

By comparison, propane conversion under the above conditions, but in the absence of carbon dioxide, leads to a loss of 40% of the zinc from the catalyst after 14 days on stream. Thus, 25 mole % carbon dioxide inhibited zinc elution by a factor of 7.

EXAMPLE 6

HZSM-5, $SiO_2/Al_2O_3 = 70:1$, was impregnated with $Zn(NO_3)_2$ in a minimum volume of D.I. (deionized) water. The sample was evaporated to dryness at room temperature then air calcined at 538° C. for 2 hours.

EXAMPLE 7

Figure 1:
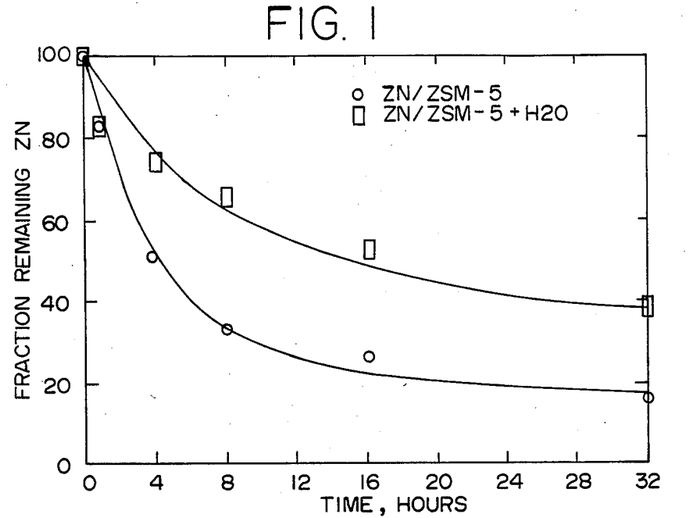
FIGS. 1 and 2 are graphs plotting the fraction of zinc remaining over time of operation using zinc catalysts where a conversion process is carried out with hydrocarbons alone as the feedstock, with a non-metal oxide added thereto, and with a sulfide co-present in the feedstock. These graphs will be described further in the Examples of the present invention hereafter.

0.5 wt. % Zn/ZSM-5 prepared as described in Example 6 was heated in 200 cc/min $H_2$ at 594° C. for 1, 2, 4, 8, 16 and 32 hours. The fraction of Zn remaining vs. treatment time is shown in FIG. 1. After 32 hours in $H_2$ at 594° C., only 0.10 wt. % Zn remains.

EXAMPLE 8

0.5 g of 1 wt. % Zn/ZSM-5, prepared as described in Example 6, was loaded in a quartz reactor. $H_2$ was passed through a $H_2O$ sparger, and then through a condenser maintained at 20° C. to control the $H_2O$ partial pressure. The catalyst was heated in 200 cc/min $H_2O/H_2$ and held at 594° C. for 1, 2, 4, 8, 16 and 32 hours. FIG. 1 shows the fraction of Zn remaining vs. treatment time for $H_2O/H_2$ and dry $H_2$. The added $H_2O$ decreases the rate of Zn loss from ZSM-5. After 32 hours at 594° C., 0.43 wt. % Zn remains.

EXAMPLE 9

Figure 2:
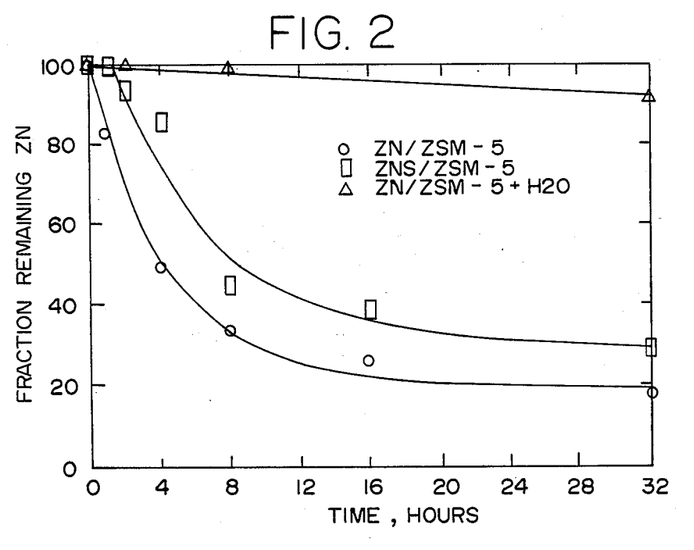

0.5 wt. % Zn/ZSM-5, prepared as described in Example 6, was treated is 2 vol. % $H_2S$ in $H_2$ at 500° C. for 2 hours. Zn elution was then tested as described in Example 2. The fraction of Zn remaining vs. treatment time is shown in FIG. 2 and compared to Zn/ZSM-5. Presulfiding the Zn/ZSM-5 reduces the initial rate of Zn loss by a factor of 4 compared to Zn/ZSM-5.

EXAMPLE 10

One (1) wt. % Zn/ZSM-5 was prepared as described in Example 6. 0.5 g of catalyst were heated in a 200 cc/min, 500 ppm $H_2S/H_2$ stream. The temperature was held at 594° C. for 1, 2, 4, 8 and 32 hours. The fraction of Zn remaining vs. treatment time is shown in FIG. 2. After 32 hours at 594° C. in 500 ppm $H_2S/H_2$, 0.9 wt. % Zn remains. $H_2S$ added to the $H_2$ greatly increases the Zn stability compared to Zn alone or presulfided Zn.

Having thus generally described the process of the present invention and discussed specific embodiments in support thereof, it is to be understood that no undo restrictions as to the scope of the present invention are to be imposed by reason thereof.

What is claimed is:

1. In a process for converting a $C_2-C_{12}$ non-aromatic hydrocarbon feed to aromatics by contacting the feed with a zinc-containing medium pore size zeolite catalyst in a conversion zone, the improvement which comprises, adding at least one non-metal oxide or organic sulfide to the feed to prevent elution of zinc from the zinc-containing zeolite catalyst in an amount of from 0.05 wt % to 20 wt % based on the total weight of the feed after the addition of non-metal oxide or organic sulfide.

2. The process according to claim 1, wherein said non-metal oxide is selected from the group consisting of carbon dioxide, water vapor, nitrogen oxide, nitrogen dioxide and dinitrogen oxide, and said sulfide is selected from the group consisting of thiophene, sulfur dioxide, carbon disulfide, dimethylsulfide and dimethyldisulfide.

3. The process according to claim 1, wherein said $C_2-C_{12}$ hydrocarbon feed comprises non-aromatic hydrocarbons, including paraffins and naphthenes and wherein olefins may be present.

4. The process according to claim 1, wherein said zeolite catalyst has a Constraint Index of from 1 to 12, a silica to alumina ratio of at least about 12, and a crystal framework density of not substantially less than about 1.6 g/cc.

5. The process according to claim 4, wherein the silica to alumina ratio is at least about 30.

6. The process according to claim 4, wherein said zeolite catalyst is selected from the group consisting of ZSM-5, ZSM-11, ZSM-12, ZSM-22, ZSM-23, ZSM-35, ZSM-38, ZSM-48 and Zeolite Beta.

7. The process according to claim 6, wherein said zeolite catalyst is ZSM-5.

8. The process according to claim 1, wherein a matrix binder is employed with said zeolite catalyst to form a catalyst composite, the composite containing the zeolite in a proportion of from 1 to 95% by weight.

9. The process according to claim 8, wherein the catalyst composite comprises from 10% to 70% by weight of the zeolite.

10. The process according to claim 9, wherein the catalyst composite comprises 65% by weight catalyst to 35% by weight matrix binder.

11. The process according to claim 1, wherein said zinc is incorporated in said zeolite catalyst in an amount from about 0.01 to about 20 wt. % based on the total weight of the zeolite and zinc.

12. The process according to claim 11, wherein said amount is from 0.1 to 10 wt. %.

13. The process according to claim 1, wherein said conversion zone is conversion reactor selected from among a fixed bed, a fluidized or fluid transport type bed, a moving catalyst bed or a heat exchange type tubular reactor.

14. The process according to claim 13, wherein said reactor is a fixed bed reactor.

15. The process according to claim 1, wherein said converting in said conversion zone occurs at a temperature of from about 650° to about 1300° F. at a pressure below about 400 psig, and the WHSV of the feed is within the range of about 0.1 to about 1000.

16. The process according to claim 15, wherein the WHSV of the feed is from 1 to 100.

* * * * *

UNITED STATES PATENT AND TRADEMARK OFFICE
CERTIFICATE OF CORRECTION

PATENT NO. : 4,849,568
DATED : July 18, 1989
INVENTOR(S) : S.B. McCullen et al.

It is certified that error appears in the above-identified patent and that said Letters Patent is hereby corrected as shown below:

Col. 1, line 54     "ter" should be --term--
Col. 7, line 64     "$pK_a 24\ 7$" should be --$pK_a \geq 7$--
Col. 8, line 25     "or" should be --of--

Signed and Sealed this

Tenth Day of July, 1990

Attest:

HARRY F. MANBECK, JR.

*Attesting Officer*     *Commissioner of Patents and Trademarks*